United States Patent Office 2,872,418
Patented Feb. 3, 1959

2,872,418

PRODUCTION OF ALUMINA-HALOGEN COMPOSITES

George L. Hervert, Downers Grove, and Herman S. Bloch, Chicago, Ill., assignors to Universal Oil Products Company, Des Plaines, Ill., a corporation of Delaware No Drawing. Application December 29, 1952
Serial No. 328,507

7 Claims. (Cl. 252—442)

This invention relates to a novel method of preparing alumina-halogen composites and in particular to a method of preparing these composites in a manner to obtain composites of high purity in a desirable form.

Alumina-halogen composites are useful as catalysts in themselves or as bases to support catalytic materials such as chromium, molybdenum, tungsten, iron, nickel, cobalt, platinum, etc., and many others, in metallic form or compounds thereof such as the oxides or sulfides. Composites of this nature are characterized by exhibiting extremely large surface areas per unit of volume and having large adsorptive capacities. By using a base such as an alumina-halogen composite a relatively expensive active catalytic material may be used in extremely small quantities, whereas otherwise large quantities of the expensive catalytic material would be needed if used alone. For example, a very effective platinum-alumina-halogen catalyst may contain as little as 0.01% by weight of platinum. By properly associating an active metal with a base the metal may exist in extremely subdivided form, approaching molecular size. An active material in this form exhibits extremely large surface area per unit of weight. Since catalytic effects are largely surface effects, and since a finely subdivided catalyst has an extremely large surface area per unit of weight, a great saving in active material can be realized by disposing it on a suitable base. Since many catalytically active materials are rare or noble metals or compounds thereof, the use of composites of these materials and alumina-halogen greatly reduces the cost of the catalyst and thereby makes the use of many catalytic materials practical. A composite such as alumina-halogen is an ideal contact material in that it is highly absorptive, thereby causing intimate contact between the various molecules involved in the reaction, highly refractory so that high temperature reactions will not change its form, and of such a structure as to be relatively light for the volume occupied. Alumina-halogen composites may be used as catalysts in themselves for many reactions and find further use as desiccants, decolorizers, refractories etc.

Some of the reactions which may be effected by alumina-halogen composites per se or in combination with other active materials include cracking of hydrocarbons to produce lighter hydrocarbons by contacting the hydrocarbons with the catalyst at a temperature of from about 700° F. to about 1200° F. or more and at a pressure of from atmospheric to about 1500 p. s. i. or more, reforming a gasoline fraction by contacting it with the catalyst at a temperature of from about 600° F. to about 1000° F. or more and a pressure of from about 50 p. s. i. to about 1000 p. s. i. or more in the presence of hydrogen, polymerization of unsaturated hydrocarbons to produce heavier hydrocarbons, alkylation of hydrocarbons to produce heavier hydrocarbons, alkyl transfer reactions as, for example, the reaction of benzene and xylene to produce toluene, hydrogen transfer reactions, treating reactions wherein small quantities of impurities are removed as, for example, the desulfurization of gasoline, oxidation reactions as, for example, the manufacture of alcohols, aldehydes, acids, etc., hydration and dehydration reactions, hydrogenation and dehydrogenation reactions, esterification reactions and many others.

It is an object of this invention to provide a novel process for the production of alumina-halogen composites of high purity and desirable physical characteristics.

Alumina or aluminum hydrate occurs in various modifications, the more common types of alumina being the following:

Alpha-alumina, often known as corundum, is the form stable at temperatures over about 1800° F.

Gamma-alumina is very stable but changes to alpha-alumina at temperatures above about 1800° F.

Epsilon-alumina is the alumina formed in thin films on the surface of metallic aluminum during oxidation by dry or wet air or oxygen.

Gamma-$Al_2O_3 \cdot 3H_2O$ or gibbsite is prepared by aging boehmite in a cold basic solution.

Alpha-$Al_2O_3 \cdot 3H_2O$ or bayerite is also formed by aging boehmite in a cold basic solution but is unstable and gradually is transformed into gibbsite.

Gamma-$Al_2O_3 \cdot H_2O$ or boehmite may be prepared in a variety of ways, one of the simplest being the addition of ammonium hydroxide to a water solution of aluminum chloride. The material originally precipitated is an amorphous alumina floc which rapidly grows to crystal size yielding crystalline boehmite. Aging of boehmite in ammonium hydroxide solution transforms the boehmite first to meta-stable bayerite and finally into stable gibbsite.

Alpha-$Al_2O_3 \cdot H_2O$ or diaspore occurs abundantly in nature.

In the specification and claims the word alumina will mean one or more of these various modifications either as anhydrous alumina or hydrated alumina unless otherwise specifically noted.

By varying the conditions of the process of this invention it will be shown that some of the various modifications of alumina as hereinbefore described may be obtained composited with a halogen.

We have discovered and our invention broadly comprises an improved method for preparing an alumina-halogen composite by reacting aluminum metal with water in the presence of a halogen ion under specific conditions and preferably in the presence of a catalytic substance. Hydrogen in a very pure state is produced as a by-product of this reaction. The aluminum to be used in our process may be any commercially available aluminum, although, when a high purity product is desired, it is preferable to start with a high purity aluminum. It is within the scope of this invention to use aluminum alloys; however, since the present process will produce a pure alumina-halogen composite, it is a preferred embodiment of the present invention to use aluminum of 99.5% purity or greater in the reaction.

In one embodiment of the present invention an alumina-halogen composite is prepared by reacting pure aluminum metal with water in the presence of a halogen ion and preferably in the presence of a catalytic substance. The rate at which the reaction of aluminum and water is effected depends upon the temperature of the reactants, the degree of subdivision of the aluminum and the amount of agitation given the mixture. Thus a reaction that proceeds slowly at a temperature of 212° F. with mild agitation or shaking will proceed very rapidly if the mixture is vigorously agitated. At a temperature of 550° F. on the other hand, the reaction proceeds very rapidly even with mild agitation. It may be seen that, when it is desired to change the reaction rate, any of the above described variables may be changed. Another manner of increasing the reaction rate may be to add to the reactants a catalytic substance which will increase the reaction rate without entering into the reaction. In the process of this invention it is preferred that the water in the reaction zone is in the liquid state and it is thus readily seen that, when temperatures in excess of about 212° F. are used, the reaction should be effected under sufficient pressure to maintain at least a portion of the water in the liquid state.

In a preferred embodiment of the present invention, an alumina-halogen composite is produced by reacting subdivided aluminum with water in the presence of a halogen ion and preferably a catalytic substance, maintaining a sufficient pressure on the reactants to keep at least a portion of the water in the liquid phase, agitating the mixture to form an alumina-halogen composite and separately recovering the alumina-halogen composite therefrom.

In a specific embodiment of the present invention an alumina-halogen composite is produced by reacting subdivided aluminum with water containing from about 0.05% to about 15% by weight of halogen in the form of ammonium halide or an organic derivative of ammonium halide at a temperature of from about 390° F. to about 700° F. and sufficient pressure to maintain the water in a liquid phase, separately recovering an alumina-halogen composite, and calcining the recovered composite at a temperature of from about 750° F. to about 1400° F. whereby a product comprising gamma-alumina and combined halogen is obtained.

In another specific embodiment of the present invention an alumina-halogen composite is produced by reacting aluminum with water in the presence of from about 0.05% to about 15% by weight of halogen in the form of ammonium halide or an organic derivative of ammonium halide and from about 0.05% to about 50% of a basic nitrogen catalyst at a temperature of from about 120° F. to about 220° F., separately recovering an alumina-halogen composite, and calcining the recovered composite at a temperature of from about 750° F. to about 1400° F. whereby a composite of gamma-aluminum and halogen is obtained.

The catalyst of this invention may contain from about 0.1% to about 15% halogen by weight; however, the preferred catalyst will contain from about 0.3% to about 8% halogen by weight.

Although it is not intended to limit this invention to the use of water as a liquid, it is highly desirable that liquid water is used in that more intimate contact of the reactants may be effected in the liquid phase. The temperature at which the reaction may be effected may be from 32° F., the freezing point of water, to 705.2° F. which is the critical temperature of water, defined as the temperature at which water cannot be liquefied by increasing the pressure thereon.

The basic nitrogen catalytic material hereinbefore referred to may be ammonium hydroxide or amine activators such as monoethanolamine, butyl amine, piperidine, etc., or mixtures thereof. The catalytic materials are true catalysts in that they are not consumed by the reaction but appear in the product in substantially the same form and in the same amount as originally added to the solution. The basic nitrogen activators are highly desirable as catalytic agents in that they are easily removed from the product by heating since the amines are volatile. The presence of a catalyst causes a great increase in the reaction rate at a given temperature and a given degree of agitation, and thereby causes the reaction to be effected at substantially milder conditions than otherwise would be necessary. This is important economically since, by the use of a catalyst, lower pressures and lower temperatures may be used. As an example of the improvement which can be effected through use of a catalyst, when 18 grams of aluminum and 100 grams of water containing halogen ion are vigorously stirred at 572° F. under a pressure sufficient to maintain the water in a liquid phase, the reaction requires approximately 4 hours for completion, i. e. complete consumption of aluminum. When approximately 9 grams of 3% ammonium hydroxide solution is added to the mixture, the reaction requires approximately 1 hour and 15 minutes to reach completion. When 18 grams of aluminum and 200 grams of distilled water containing halogen ion are reacted at 176° F. the reaction proceeds very slowly and would require several days for completion of the reaction. When a catalytic amount of ethanolamine is introduced into the reaction zone, the reaction is substantially complete within 24 hours. It has further been found that aluminum base alloys will readily react in the presence of a catalytic material such as those hereinbefore described. As an example, an alloy such as 2S aluminum containing 1% iron, 0.2% manganese, 0.1% copper, 0.2% silicon, 0.05% gallium, 0.03% magnesium, and 0.008% titanium reacts readily at relatively mild temperatures in water containing a catalyst.

It is also within the scope of this invention to use the salts of catalytic basic nitrogen compounds as catalysts, such as ethanolammonium acetate, diethanolammonium acetate, or triethanolammonium propionate.

Although the temperature range in which the reaction may be effected is from the freezing point of water to the critical temperature of water, it is preferred that the higher temperatures of this range, that is above about 125° F. be used to accelerate the reaction. The temperature at which the reaction is effected is likewise important in determining the final form of the alumina-halogen composite. In the lower range of temperatures as, for example, from about 32° F. to about 160° F., the composite is produced in extremely finely divided form; that is, the alumina is produced in finely divided form without requiring further attrition or grinding. When alumina-halogen composites are produced at a low temperature they are produced in the form of impalpable powders directly. As the temperature of the reaction is increased, the particles are formed in increasingly larger crystal size. Reactions effected at a relatively low temperature produce a composite of gibbsite alumina and halogen. When the reaction is effected at 400° F. the product is primarily gibbsite, however, traces of boehmite are present. As the temperature of the reaction is increased above 400° F., the amount of boehmite in the product is correspondingly increased and at a temperature of approximately 650° F. the product of the reaction is essentially a boehmite-halogen composite. The amount of catalyst present in the reaction zone also affects the size of the particles; the higher the concentration of catalyst, the greater the particle size. Furthermore, when small particle size is desired and it is desired to increase the reaction rate, it is preferred to increase the degree of agitation.

In a preferred embodiment the halogen in the reaction zone is present as the halide of a basic nitrogen compound. Thus when an alumina-fluorine composite is desired, it is preferable to react aluminum with water containing ammonium fluoride, mono-methyl ammonium fluoride, monoethyl ammonium fluoride, dimethyl ammonium fluoride, etc. Although it is preferred to add the halogen as basic nitrogen compound halide, it is within the scope of this invention to add the halogen as any organic halide, hydrogen halide or a metal halide whereby two processing steps may be combined. For example, when it is desired to produce an alumina-halogen composite containing an active metal such as for example, alumina-chlorine-iron composite, the aluminum metal may be reacted with water in a solution containing iron-chloride whereby the desired composite is produced directly. It is preferred, however, to produce the alumina-halogen composite first by using a basic nitrogen compound halide and to later impregnate the composite with the active metal. This preference is based on practical considerations which are necessary to conserve the relatively expensive active metal, for example, when a finely divided alumina-chlorine-platinum powder is produced, it is necessary to use extreme care to avoid loss of the powder. It is therefore preferable that an alumina powder be produced and processed first so that small losses are expendable and to impregnate the alumina later when the opportunities for losses due to dust formation etc. have been eliminated.

The product from the process of this invention is well suited to be used in fluidized processes, moving bed processes, slurry type processes, or fixed bed processes. When employed in any of these processes the product may be used as produced or it may be formed into shapes such as spheres, pills, cylinders, etc. For fixed bed processes it is particularly desirable to pill the catalyst before impregnating with an active substance since the use of a pilled catalyst causes a fixed bed process to be operated without extreme pressure drops across the catalyst bed.

The product produced by the process of this invention is a separately distinct material from the aluminum in the reaction zone. It is not necessary, in fact it is extremely undesirable, in the process of this invention, to scrape or cut the product from the aluminum reactant. When the process is carried out as hereinbefore described, any unreacted aluminum metal in the reaction zone is free and unattached to the bulk of the oxide product, and the product that is formed is pure and occurs in distinct particles completely separate from the reacting aluminum. The alumina-halogen composite that is formed is in the form of crystals of varying size as distinct from a gel or floc. Even the extremely small crystals are easily filtered and handled in that they form a particulated filter bed rather than a gelatinous clogging mass. The crystals are formed directly, and aging to produce them is unnecessary. The supernatent solution contains no impurities which must be washed from the product, a simple filtration being the only separation step that is necessary if the reaction has been completed. If the reaction has not been completed, separation of metallic aluminum from the alumina-halogen crystals is readily effected by virtue of size or density differences as, for example, when the aluminum metal is to be separated from the product, the particle size of the aluminum may be different from that of the product and the separation may be effected by passing the total stream through a screen designed to pass either the aluminum or the product and to hold the other. When the aluminum and the product are of substantially the same particle size, flotation methods may easily be employed in that the densities of the two substances are substantially different.

Any suitable apparatus may be used to effect the process of this invention, however, one particularly well-suited apparatus for carrying out the reaction at higher temperatures comprises a pressure vessel fitted with an agitating means and a vent through which the hydrogen by-product may be vented to reduce the pressure in the reaction zone. As hereinbefore stated the effluent from the reaction zone may be passed through a filter and/or screen whereby the supernatant liquid is separated from the product and the product is separated from unreacted aluminum. The product thus separated from the supernatant liquid is then subjected to a calcination which performs the dual function of removing further water from the product and driving off any residual catalytic material. It may be noted that the hydrogen by-product of the reaction is in an extremely pure form and may be used for any desired purpose.

Following are four examples which are given to further illustrate the process of our invention with the understanding that the invention is not unduly limited to the particular process or materials described in the examples.

Example I illustrates the process of this invention with no catalyst present in the reaction zone. Examples II, III, and IV illustrate the process of this invention with catalyst. All examples illustrate the invention using various conditions and materials to obtain specific products. It may be noted that after calcination the product in each example is halogen combined with the active gamma form of alumina.

Example I 18 grams of aluminum turnings of 99.9+% purity, 350 grams of distilled water and 7.8 grams of ammonium fluoride were placed in an autoclave which was provided with a high speed stirring device, the mixture was heated to 572° F. and allowed to react for 12 hours with vigorous stirring. An examination of the product showed that 98% of the aluminum was converted to alumina, producing a product white in color and of fine grain size. An analysis of the product showed that it contained about 5% gibbsite and about 95% boehmite. The product was calcined at about 1200° F. for 4 hours and an analysis of the resultant product showed it to be gamma alumina containing 7.1% fluorine.

Example II 18 grams of aluminum chips of 99.9+% purity, 200 grams of water, 12 grams of triethanolamine and 11 grams of ammonium fluoride were placed in a Pyrex flask fitted with a high speed stirrer and then heated to 150° F. and allowed to react for 6 hours with vigorous stirring. Upon examination of the product it was found that 100% of the aluminum reacted yielding a gibbsite-fluorine composite. The product was of extremely fine grain size and white in color. The product was calcined at 1200° F. for 4 hours and an analysis of the resultant product showed it to be gamma alumina containing 8.2% fluorine.

Example III 18 grams of aluminum chips of 99.9+% purity, 400 grams of water, 24 grams of monoethanolamine and 24 grams of methyl ammonium chloride were placed in a Pyrex flask fitted with a high speed stirrer and allowed to react for 285 hours at room temperature with vigorous stirring. The aluminum was 100% converted and an examination of the resulting product showed it to be a fluorine-gibbsite composite. The product was calcined at 1200° F. An analysis of the resultant product showed it to be gamma alumina containing 3.2% chlorine. The product was a white impalpable powder which had an average grain size of about 3 microns.

Example IV 27 grams of aluminum chips of 99.9+% purity, 470 grams of distilled water, 30 grams of monoethanolamine and 0.597 gram of ammonium fluoride were placed in a Pyrex beaker fitted with a high speed stirrer and allowed to react for 6 hours at 212° F. 98.9% of the aluminum reacted and an examination of the product showed the alumina to be mainly gibbsite. The product was calcined at 1200° F. for 4 hours. The resulting product was gamma-alumina containing 0.55% fluorine.

We claim as our invention:

1. A process for producing halogen-centaining alumina which comprises reacting aluminum metal with water in the presence of an ammonium halide.

2. A process for producing halogen-containing alumina which comprises reacting aluminum metal with water in the presence of an ammonium fluoride.

3. A process for producing halogen-containing alumina which comprises reacting aluminum metal with water in the presence of an ammonium halide and at least one catalyst selected from the group consisting of ammonia, ethanolamines, butylamine and piperidine.

4. The process of claim 3 further characterized in that said halide is amminium fluoride and said catalyst is monoethanolamine.

5. A process for producing halogen-containing alumina which comprises reacting aluminum metal with water in the presence of an ammonium fluoride and an ethanolamine catalyst.

6. A process for producing halogen-containing alumina which comprises reacting aluminum metal with water containing from about 0.05% to about 15% by weight of halogen in the form of an ammonium halide at a temperature of from about 32° F. to about 705° F.

7. A process for producing fluorine-containing alumina which comprises reacting aluminum metal with water containing from about 0.05% to about 15% by weight of fluorine in the form of an ammonium fluoride at a temperature of from about 32° F. to about 705° F.

References Cited in the file of this patent

UNITED STATES PATENTS

| | | |
|---|---|---|
| Re. 22,196 | Heard | Oct. 6, 1942 |
| 2,154,603 | Bley | Apr. 18, 1939 |
| 2,328,846 | Pitzer | Sept. 7, 1943 |
| 2,623,860 | Haensel | Dec. 30, 1952 |
| 2,746,842 | Bloch et al. | May 22, 1956 |

OTHER REFERENCES

Mellor's, "Comprehensive Treatise on Inorganic Chemistry," New York, vol. 5 of 1924, pages 205–206.